United States Patent
Zhang

(10) Patent No.: US 9,883,390 B2
(45) Date of Patent: Jan. 30, 2018

(54) METHOD AND A DEVICE OF AUTHENTICATION IN THE CONVERGED WIRELESS NETWORK

(71) Applicant: Alcatel-Lucent, Paris (FR)

(72) Inventor: Kaibin Zhang, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/348,700

(22) PCT Filed: Nov. 20, 2012

(86) PCT No.: PCT/IB2012/002686
§ 371 (c)(1),
(2) Date: Mar. 31, 2014

(87) PCT Pub. No.: WO2013/080035
PCT Pub. Date: Jun. 6, 2013

(65) Prior Publication Data
US 2014/0258723 A1    Sep. 11, 2014

(30) Foreign Application Priority Data

Nov. 28, 2011 (CN) .......................... 2011 1 0386881

(51) Int. Cl.
*H04L 9/32* (2006.01)
*H04W 12/06* (2009.01)
(Continued)

(52) U.S. Cl.
CPC ........... *H04W 12/06* (2013.01); *H04L 9/3271* (2013.01); *H04L 63/08* (2013.01); *H04W 88/06* (2013.01); *H04W 88/10* (2013.01)

(58) Field of Classification Search
CPC ............................................... H04M 15/8038
See application file for complete search history.

(56) References Cited

U.S. PATENT DOCUMENTS 6,876,747 B1* 4/2005 Faccin et al. ................. 380/247
8,959,598 B2* 2/2015 Smith ............................. 726/5
(Continued)

FOREIGN PATENT DOCUMENTS

EP     1672945 A1    6/2006
JP     2004088148 A  3/2004
(Continued)

OTHER PUBLICATIONS

International Search Report PCT/ISA/210 for International Application No. PCT/IB2012/002686 dated Jul. 9, 2013.

(Continued)

*Primary Examiner* — Esther B Henderson
(74) *Attorney, Agent, or Firm* — Harness, Dickey & Pierce, P.L.C.

(57) ABSTRACT

In the existing WLAN network, the authentication method using the pre-shared cipher key has low safety, and is not applicable for large scale deployment; while the authentication method based on 802.1x is very complex and needs to introduce EAP/RADIUS servers. The invention provides an authentication method and device in a converged wireless access network, wherein, the wireless access network and the UE all maintain a cipher key of a UE for accessing the first wireless access network, when the UE accessing the second wireless access network, the wireless access network and the UE implements the authentication based on the cipher key. In the invention, the UE key for accessing the first wireless access network, which has been obtained safely, is used in the authentication for the access of the UE in the second wireless access network. Compared to the traditional solution of the shared cipher key, the proposed solution ensures safety; and compared to the traditional 802.1x solution, it saves the operation of obtaining the (Continued)

cipher key via negotiating, and does not need to involve the network element such as key servers etc.

16 Claims, 3 Drawing Sheets

(51) Int. Cl.
    *H04L 29/06*     (2006.01)
    *H04W 88/06*     (2009.01)
    *H04W 88/10*     (2009.01)

(56) References Cited

U.S. PATENT DOCUMENTS

| | | |
|---|---|---|
| 2006/0128362 A1 | 6/2006 | Bae et al. |
| 2006/0256751 A1* | 11/2006 | Jagadeesan et al. .......... 370/331 |
| 2008/0130597 A1 | 6/2008 | Kalhan |
| 2009/0047952 A1* | 2/2009 | Giaretta ............... H04W 8/04 455/435.1 |
| 2009/0217048 A1* | 8/2009 | Smith ........................ 713/176 |
| 2011/0044286 A1* | 2/2011 | Jain .................... H04W 72/085 370/331 |
| 2013/0095789 A1 | 4/2013 | Keevill et al. |

FOREIGN PATENT DOCUMENTS

| | | |
|---|---|---|
| JP | 2005094758 A | 4/2005 |
| JP | 2005198322 A | 7/2005 |
| JP | 2006067174 A | 3/2006 |
| JP | 2010118861 A | 5/2010 |
| WO | WO-2008066927 A2 | 6/2008 |
| WO | WO-2013054122 A2 | 4/2013 |

OTHER PUBLICATIONS

"Discussions on Carrier Aggregation across LTE and WIFI," 3GPP TSG-RAN meeting #53, RP-111094, Fukuoka, Japan, Sep. 2011, pp. 1-4.

* cited by examiner

METHOD AND A DEVICE OF AUTHENTICATION IN THE CONVERGED WIRELESS NETWORK

TECHNICAL FIELD

The invention relates to wireless networks, especially relates to the converged wireless network.

BACKGROUND OF THE ART

The rapid growth of mobile data services caused a lot of pressure on wireless cellular network, especially the wireless access network. Now the wireless access capability needs to be enhanced urgently to meet the rapidly growing demand. At the same time, due to its inexpensive, simplicity and easy to handle, WiFi has been widely deployed worldwide. More and more client devices have the dual-mode access function of WiFi and wireless cellular at the same time, such as smart mobile phone, iPads, netbook and so on. The increased availability of the dual-mode terminal is to integrate WiFi and 3GPP wireless access (3G/4G) into a multimode wireless access environment, and the rapid growth of the quantities of dual-mode terminals makes it possible that improving wireless access capacity by converging the two access technologies of WiFi and the wireless cellular access technology (3G/4G).

A solution of establishing the multimode wireless access network is to integrate a WiFi access point and a wireless cellular network base station in the same equipment, and access a mobile core network through a common backhaul line. Typically, this multimode wireless access system is a kind of overlapping heterogeneous network. A cellular network provides complete coverage to provide mobility support, while in the locations where WiFi signals are available, for example in a hot spot or hot zone, WiFi is used to enhance the wireless access capability.

In this converged multimode wireless access network, it is an important problem to be solved that how to provide safe access control and secure data transmission in the WiFi wireless link.

The typical WiFi access procedure is illustrated in FIG. 1, which can be divided into three phases: scan, authentication and association.

In order to discover a WiFi AP (Access Point), firstly a WiFi station (STA) performs a link layer procedure called "scan". In 802.11, there are two scan methods: passive and active. In passive scanning, the STA listens for beacon frames transmitted by the APs at regular intervals. The beacon comprises the information such as SSID, supported rates and security parameters and so on. The STA can also obtain the same information by using active scanning. During the active scanning (or probing), the STA transmits probe request frames, and after receiving the probe request frames, APs will respond with the probe response frames comprising the information similar to that comprised in the beacon frames in the passive scanning. Thus the STA can collect the information about the candidate APs and selects one of them. The AP's selection depends on some factors, such as signal quality, access network capabilities, user preferences and so on. After selecting an AP, the STA will proceed the access authentication phase. Once the authentication is successfully completed, the STA will finally negotiate with the new AP the communication data rate and the reserved resources through the association procedure. The AP finally replies with an association response including the supported data rates and the session ID.

At present, the WiFi access authentication comprises two major mechanisms: the preshared key authentication and the access authentication based on 802.1x. The preshared key authentication requires presetting the key between the two communication parties before the key is used, and the AP and all the related clients share the same key. The authentication process is illustrated in FIG. 1. Firstly, the WiFi STA sends the authentication request to the AP. Once the AP receives the request, it will reply with an authentication frame comprised of a 128 octets of challenge text that is generated in the random way. Next, the STA will copy the challenge text into an authentication frame and encrypt it with the shared key, then send the encrypted frame to the AP. In the fourth step, the AP will decrypt the returned challenge text using the same shared key and compare it to the original copy sent earlier. If a match occurs, then the AP will reply with an authentication response indicating an authentication success; if not, the AP will send an authentication failure indication. The shared key authentication solution is very simple, and it does not require the involvement of other equipments. However, the key needs to be shared among the AP and all the clients in advance, which makes the solution more fit the home or small offices with limited number of users. For a large scale network with thousands or tens of thousands of APs and wireless stations, it will result in a huge amount of work to share the keys. And it is not easy to dynamically change the key. Furthermore, the solution is vulnerable since the keys are the same in all related STAs and the APs. Therefore, this method is not applicable to the large scale network deployment in an operator level.

The second typical authentication method is based on 802.1x. The process is illustrated in FIG. 2. The communication standard between the AP and AS (Authentication Server) is RADIUS (Remote Authentication Dial In User Service). The authentication session between the STA and AS is carried in EAP (Extensible Authentication Protocol) frames. The EAP frames are carried as EAPOL (EAP over LAN) in 802.1x, and are carried as EAP message parameters in RADIUS.

In the solution based on shared key, after the association, the STA will be able to gain network access. In the solution based on 802.1X, however, this is not enough. In order to transmit data frames through an established association, the STA must unlock the 802.1X port mapped to the newly created association. In order to do that, the STA will perform EAP authentication using 802.1X frames.

The EAP authentication is initiated when the STA transmits an EAPOL-Start frame, or when the AP transmits an EAP-Identity request frame. The STA then uses the authentication credentials and a certain EAP authentication method to authenticate with a back-end EAP server. The AP acts as a pass-through entity by forwarding EAP packets from the STA to the back-end EAP server and vice versa. EAP packets are extracted from 802.1x frames and encapsulated in RADIUS messages, then sent to the back-end EAP server, which extracts the EAP payload from the message and sends the reply message to the STA through the AP.

After multiple signaling interaction between the EAP and the STA (the detailed procedure depends on the EAP authentication method in use), the EAP server determines whether it has successfully authenticated the STA identity. In case of a success, the EAP server transmits an EAP-Success message. The key information may be sent to the STA and the AP as well. The AP then unlocks the 802.1x port mapped to the associated STA. The unlocked 802.1x port allows only protected and authenticated data frames to pass through.

The authentication method based on the 802.1x can provide the centralized authentication and key management for the WiFi clients. However, it is a complex method that requires the introduction of the EAP/Radius server as well as supporting the 802.1x protocol in both the WiFi clients and the AP. In addition, for operators, in order to facilitate the maintenance and to lower down the cost, the WiFi authentication must be integrated with the cellular network. Therefore, the cellular network elements, e.g. HLR/HSS need to support the inter-operation with the WiFi authentication server, which increases the system complexity further.

In a summary, the pre-shared key authentication method has low safety, is vulnerable, difficult to maintain and does not fit the large scale deployment. While the authentication method based on 802.1x needs to introduce the EAP/Radius server as well as the support from the WiFi clients and the AP, whose cost and complexity are high. In addition, the inter-operation with the cellular network further increases the complexity of the solution.

SUMMARY OF THE INVENTION

The invention aims to provide a novel authentication and data encryption method for the WiFi access in the multi-mode wireless access environment. The target scenario applicable for the invention includes the converged multi-mode wireless network, wherein, the cellular and the WiFi wireless interfaces are equipped in both the access node and the user equipments (UEs). That's to say, the UE is dual-mode, and the WiFi AP and the cellular base station are integrated into a single device (a converged access node). The inventional concept of the invention is that the converged access node is capable of managing and sharing the information of both wireless interfaces, for example, the key information, the identification of the UE and the identification of the cell. And the converged access node uses the key, originally used for encrypting the information over the cellular wireless interface, to authenticate the WiFi access and encrypt the data transmission over WiFi. Since the key is unique and exclusive for a single user client in a single cell, the converged access node can identify the key by taking the UE identification as the index. The authentication procedure comprises the following aspects:

Dual-mode UE sends in the access request the identification of the cell to which it attaches and the identification of itself. Both of the identifications were previously acquired via the air interface of the mobile cellular network.

Once a converged access node obtains the request, it will send back a response if the cell identification in the request is the same with the cell it serves. The response comprises a challenge created in a random way.

The dual-mode UE receives the response via the WiFi interface, encrypts the challenge with the key, and sends back the ciphered text to the converged access node. Wherein, the key is the one originally used to encrypt the data or signaling over the cellular radio interface, and now it serves as the key to authenticate the WiFi access and encrypt the data transmission over the WiFi.

The converged access node obtains the cipher text, decrypts the cipher text with the key, and compares it with the copy of the challenge text previously sent out. If both are the same, the authentication succeeds and the access node sends back a response indicating the authentication success. Otherwise, it will reply with a failure indication. Wherein, by taking the user identification as the index, the access node can obtain a key corresponding to the key used by the UE in the cellular wireless interface, e.g. a symmetric key or a private key or a public key in the asymmetric keys, as the key used for decrypting the cipher text.

According to the improvement aspect of the invention in the wireless access devices, a method of implementing authentication with multiple user equipments (UEs) in a wireless access device is provided, the access device integrates access functions of a first wireless access network and a second wireless access network, and the method comprises the following steps:

i. maintaining cipher keys of the UEs for accessing the first wireless access network;

ii. receiving an access request of accessing the second wireless access network from the UE;

iii. implementing the authentication with the UE, based on the cipher key.

In the aspect, the key of the UE used for accessing the first wireless access network, which has been obtained safely by the access device, is used for authenticating to the access of the UE in the second wireless access network, compared to the traditional solution of shared key, this ensures safety; compared to the traditional 802.1x solution, it saves the operations of re-negotiating to obtain the key, it don't need involve the key server and other elements, and only implements some functional modification to the access device and UEs. And, the aspect still provides a kind of centralized key management, which can facilitate maintaining.

According to a preferred embodiment, the step iii comprises the following steps:

a. determining the cipher key unique to the UE;

b. using the cipher key to implement the authentication with the UE.

In the embodiment, the cipher keys of UEs for accessing the first wireless network are different for each UE respectively, i.e. the cipher key is unique. Thus, compared to the pre-shared cipher key solution, it improves safety and is suitable for large scale deployments.

According to another preferred embodiment, the access request comprises a UE identification of the UE in the first wireless access network, and the step a comprises:

a1. extracting the UE identification from the access request;

a4. finding the cipher key corresponding to the UE from the maintained cipher keys, based on the UE identification.

In the embodiment, it determines the UE by using the UE identification, and determines the cipher key correspondingly, which provides an easy method to obtain the cipher key.

According to a further preferred embodiment, the access request comprises a network identification of the first wireless access network which the UE has accessed, and the step a still comprises:

a2. extracting the network identification from the access request;

a3. determining whether the UE has accessed the first wireless access network via the access device, based on the extracted network identification and the UE identification: if the result is yes, implementing the subsequent operations.

In the embodiment, before authenticating, it still determines whether the UE has accessed the first wireless access network via the access device, which improves the robustness of the authenticating process.

According to a preferred embodiment, the first wireless access network comprises a wireless mobile network, and the second wireless access network comprises a wireless local coverage network. The wireless mobile network is a cellular wireless network such as 2G, 3G or LTE etc. The cipher key used for this wireless network has strong safety, which is suitable for authenticating the access to the WiFi network when the UE moves into the coverage of a wireless local coverage network such as WiFi.

Accordingly, for the improvement aspect of the invention in a UE, a method, in a UE, of implementing authentication with a wireless access device is provided, the UE can access the access device via a first wireless access network and a second wireless access network, and the method comprises the following steps:

i. maintaining a cipher key of the UE for accessing the first wireless access network;

ii. sending an access request of accessing the second wireless access network to the access device;

iii. implementing the authentication with the access device, based on the cipher key.

From the equipment view of the invention, in one aspect, an authentication device used for a wireless access device is provided, the access device integrates the access function of a first wireless access network and a second wireless access network, and the authentication device comprises:

a cipher key maintaining unit, which is used for maintaining cipher keys of UEs used for accessing the first wireless access network;

a receiver, which is used for receiving an access request of accessing the second wireless access network from the UE;

an authenticator, which is used for implementing the authentication with the UE based on the cipher key.

In another aspect, an authentication device used for a UE is provided, the UE can access a wireless access device via a first wireless access network and a second wireless access network, and the authentication device comprises:

a cipher key maintaining unit, which is used for maintaining a cipher key of the UE for accessing the first wireless access network;

a transmitter, which used for transmitting an access request of accessing the second wireless access network to the access device;

an authenticator, which is used for implementing the authentication with the access device based on the cipher key.

BRIEF DESCRIPTION OF THE DRAWINGS

By reading the detailed description of the non-limiting embodiment referring to the following drawings, other features, purposes and advantages of the invention will become clearer.

DETAILED DESCRIPTION OF EMBODIMENTS

The following will describe in detail the embodiments. It needs to explain that in the case of not conflicting, the embodiments of the application and the features in the embodiments may be combined with each other.

Figure 3:
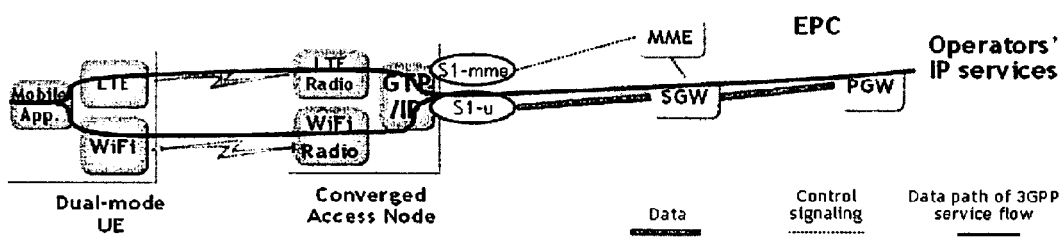
FIG. 3 shows an exemplary network structure of a converged wireless access network.

The following gives an embodiment of the invention. FIG. 3 illustrates the exemplary network architecture of the converged wireless access network. The dual-mode UE is equipped with a LTE interface and a WiFi interface at the same time. It can use the two wireless interfaces to implement the communication of IP service flows simultaneously. Both the WiFi access point function and the LTE eNB function are integrated in the converged access node, and they use the common IP and backhaul link to connect the mobile core network. In the embodiment, the converged access node is capable of managing and sharing the information of both wireless interfaces, for example, the key information, the UE identification and the cell identification. In such an overlay heterogeneous network, LTE provides the full coverage with the mobility support, while WiFi is used to enhance the capacity of the wireless access.

When a dual-mode UE is initialized, it always tries to access the cellular mobile network (LTE network) to complete the authentication and authorization. After accessing the cellular network, the UE and the access device will maintain the cipher keys for accessing the cellular network which are signaling keys or service keys of the cellular network. The cipher key can be a symmetric key, and it also can be a pair of asymmetric keys. Wherein, the method to obtain the cipher key for accessing the cellular mobile network is not concerned by the invention. Any of existing or newly developed methods to obtain the cipher key of the cellular mobile network all are applicable for the invention.

Figure 1:
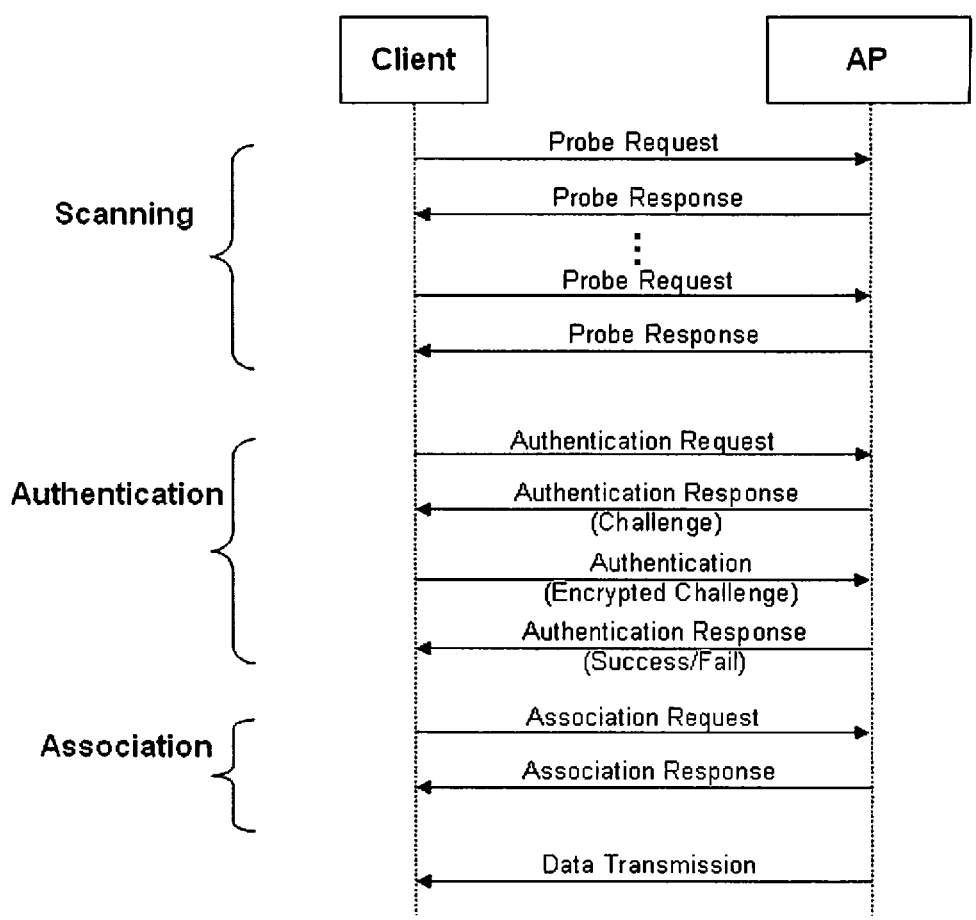
FIG. 1 shows the current access process of the WiFi.
Figure 2:
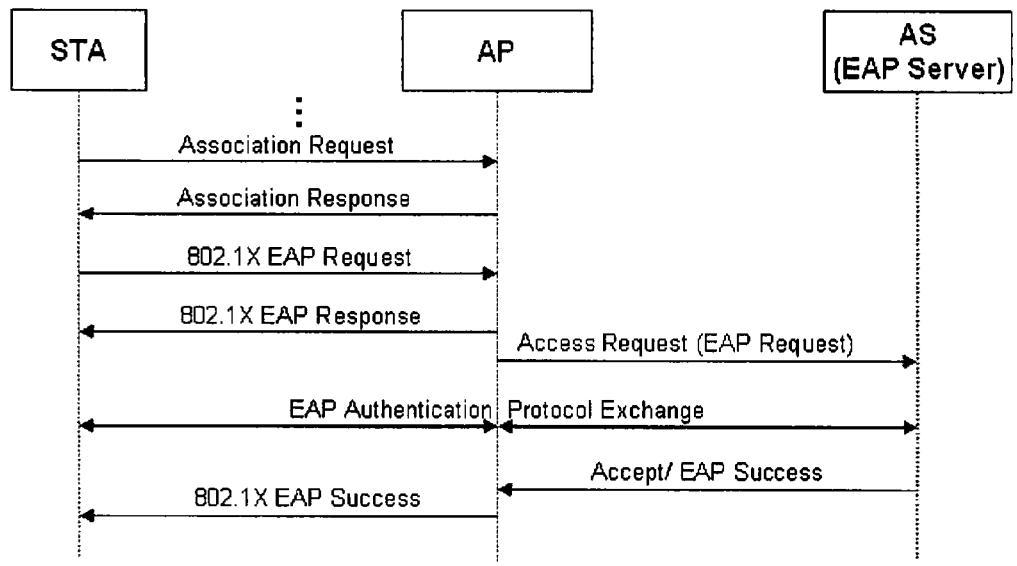
FIG. 2 shows the current access and authentication process based on 802.1x.
Figure 4:
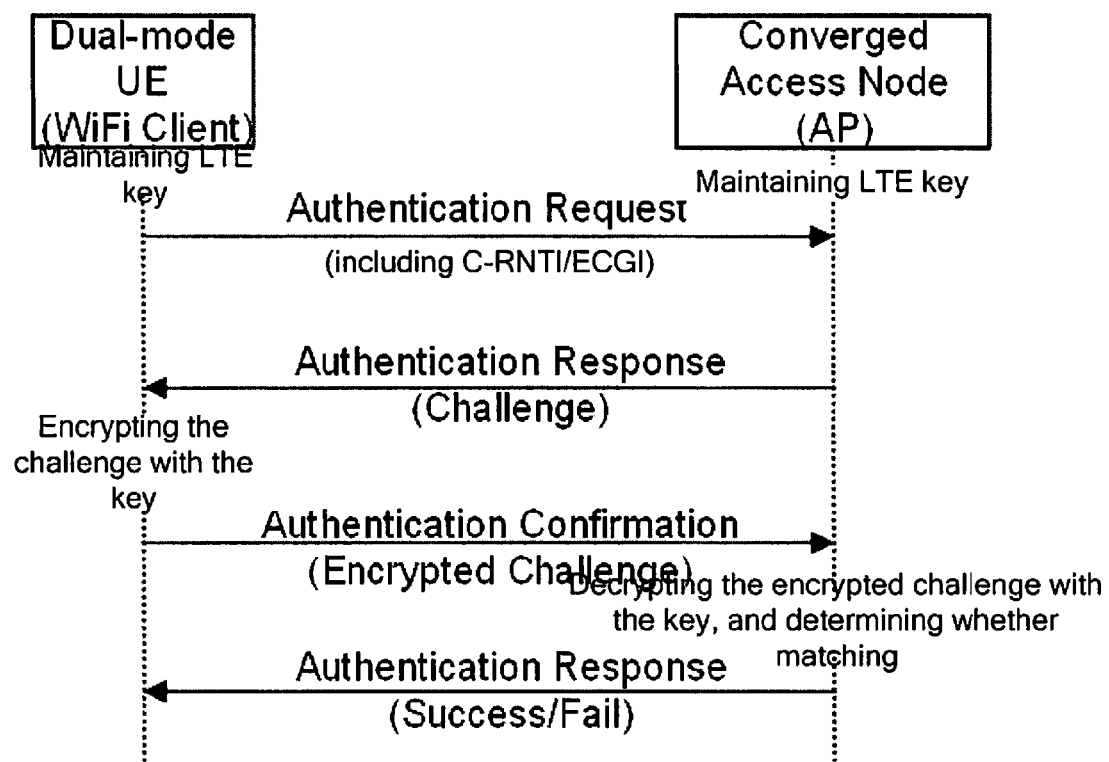
FIG. 4 shows an access and authentication process according to an embodiment of the invention.

During moving, once detecting the WiFi signal, the UE will implement an access authentication of WiFi. After passing the authentication, the UE is allowed to access via WiFi. The WiFi access process is similar to the one shown in FIG. 1, and comprises three major phases, scanning, authentication and association. However, the authentication procedure, illustrated in FIG. 4, is remarkably different with the existing technology.

First, the UE sends the authentication request to the access node. The authentication request message comprises the UE identification and the cell identification to which it currently attaches via the cellular network interface. In a detailed embodiment, the UE identification can be the C-RNTI (Cell Radio Network Temporary Identifier), which provides a unique UE identification in the cell. In a detailed embodiment, the cell identification can be the ECGI (EUTRAN Cell Global Identification), which is used to identify a cell in a globe range. The identification is broadcasted to UEs as the cellular system information in the cellular network. All UEs can get it via the cellular wireless interface.

By checking the cell identification, the access node can determine if the UE sending the authentication request is attached to the present cell. And, the access node determines if the UE is one of UEs attached to the cell, according to the UE identification. But, it should be understood that both of two determinations are not indispensable with respect to a basic implementation of the invention.

Next, if the converged access node confirms that the cell identification in the received authentication request message is the same as that of the cell it serves, and the UE identification in the request message indicates a UE in the attached state, the converged access node can send back an authentication response. The response includes a challenge text that is generated preferably in a random way.

Next, once the UE receives the authentication response over the WiFi interface, it will copy the challenge text into a new authentication message and encrypt it with the maintained key of the cellular wireless network (LTE). In the cellular wireless network layer, both the UE and the cellular base station hold the common encrypted cipher key, which is uniquely used to encrypt the LTE user data or signaling between the UE and the cellular base station. Usually, the encrypted cipher key is obtained according to the cipher key establishment mechanism of 3GPP standard. Since the cipher key is dedicated and unique in the cellular wireless network layer, and used for securing the data transmission, while in the existing WiFi, all connected WiFi clients hold the same cipher key to encrypt the data transmission, the cipher key in the embodiment is more secure than the existing pre-shared key in WiFi (WLAN).

The converged access node gets the authentication message, and decrypts the challenge text with the cipher key. It may be understood that, in the case of using the symmetric cipher key for accessing the cellular network, the cipher key used by the access node and the UE are the same; in the case of asymmetric cipher keys, the access node and the UE use the matched public key and private key.

Finally, the converged access node compares the decrypted result and the challenge text originally sent out. If the decrypted result is the same with the challenge text originally sent out, the converged access node determines the authentication success, and sends an authentication response to the UE to indicate the authentication success. Otherwise, the converged access node will reply with the indication of the authentication fail.

Corresponding to the above methods, from the equipment view, an authentication device used for a wireless access device is provided, the access device integrates the access function of a first wireless access network and a second wireless access network, the authentication device comprises:

a cipher key maintaining unit, which is used for maintaining cipher keys of UEs for accessing the first wireless access network;

a receiver, which is used for receiving an access request of accessing the second wireless access network from the UE;

an authenticator, which is used for implementing the authentication with the UE based on the cipher key.

Wherein, the cipher key maintaining unit can be realized by a cipher key database, the receiver comprises the physical WiFi antenna and the logical WiFi protocol stack, the authenticator can be achieved by CPU, the WiFi antenna and the WiFi protocol stack, which can achieve the determination of whether the UE passes the access device to attach the cell and achieve the detailed authentication process: generating and sending the challenge, receiving and decrypting the challenge encrypted by the UE and determining if the two challenges are matched, and sending the authentication response.

Similarly, the invention still provides an authentication device used for a UE, the UE can access a wireless access device via a first wireless access network and a second wireless access network, the authentication device comprises:

a cipher key maintaining unit, which is used for maintaining a cipher key of the UE for accessing the first wireless access network;

a transmitter, which is used for transmitting an access request of accessing the second wireless access network to the access device;

an authenticator, which is used for implementing the authentication with the access device based on the cipher key.

Wherein, the cipher key maintaining unit can be achieved by a cipher key database, the receiver comprises the physical WiFi antenna and the logical WiFi protocol stack, the authenticator can be achieved by CPU, the WiFi antenna and the WiFi protocol stack, which can achieve the detailed authentication process: receiving the challenge, encrypting and sending the challenge, receiving the authentication response.

Certainly, there are other various embodiments of the invention. E.g. the above elucidates the first and second wireless access network by taking the LTE network and WiFi network as examples respectively. It may be understood that the first and second wireless access network are not limited, the first wireless access network may be 3G network. Without departing from the spirit and essence of the invention, those skilled in the art may make all kinds of corresponding changes and modifications to the invention, while the corresponding changes and modifications should belong to the protect range of the claims attached by the invention.

What is claimed is:

1. A method of authenticating multiple User Equipments (UEs) in a wireless access device, the method comprising:

maintaining cipher keys of the multiple UEs for accessing a first wireless access network;

receiving an access request for accessing a second wireless access network from a UE;

extracting a network identification and a UE identification of the UE from the access request, the network identification being a network identification of the first wireless access network accessed by the UE;

sending an authentication message to the UE;

receiving an encrypted authentication message from the UE, the encrypted authentication message having been encrypted by the UE using a cipher key associated with the UE, the cipher key having been previously used by the UE to access the first wireless access network;

determining, based on the extracted network identification and the UE identification, if the UE has accessed the first wireless access network via the wireless access device; and authenticating the UE based on the received encrypted authentication message, if the UE has accessed the first wireless access network, the wireless access device integrating the access functions of the first wireless access network and the second wireless access network to facilitate access for the UE to both the first wireless access network and the second wireless access network.

2. The method of claim 1, wherein the method further comprises:

determining the cipher key that is unique to the UE.

3. The method of claim 2, wherein the determining the cipher key comprises:

finding, based on the UE identification, the cipher key corresponding to the UE from the maintained cipher keys, wherein the access request includes the UE identification of the UE in the first wireless access network.

4. The method of claim 1, wherein the authenticating the UE comprises:

generating the authentication message randomly;

receiving the encrypted authentication message from the UE;

decrypting the encrypted authentication message based on the cipher key;

comparing the decrypted authentication message and the generated authentication message;

authenticating the UE when the comparing indicates that the decrypted authentication message is consistent with the generated authentication message; and sending an authentication response message to the UE to indicate that the UE is authenticated.

5. The method of claim 1, wherein
the first wireless access network includes a wireless mobile network, and
the second wireless access network includes a wireless local coverage network.

6. A method of authenticating a User Equipment (UE) in a wireless access device, the UE accessing the wireless access device via a first wireless access network and a second wireless access network, the method comprising:
maintaining a cipher key of the UE for accessing the first wireless access network;
sending an access request for accessing the second wireless access network to the wireless access device, the access request including a network identification and a UE identification of the UE in the first wireless access network, the network identification being a network identification of the first wireless access network accessed by the UE;
receiving an authentication message from the wireless access device; and
sending an encrypted authentication message to the wireless access device, the encrypted authentication message having been encrypted by the UE using the cipher key associated with the UE, the cipher key having been previously used by the UE to access the first wireless access network, the wireless access device authenticating the UE based on the sent encrypted authentication message, if the UE has accessed the first wireless access network as determined based on the network identification and the UE identification, the wireless access device integrating the access functions of the first wireless access network and the second wireless access network to facilitate access for the UE to both the first wireless access network and the second wireless access network.

7. The method of claim 6, wherein the method further comprises:
receiving an authentication response message from the wireless access device to indicate that the UE is authenticated.

8. The method of claim 6, wherein
the first wireless access network includes a wireless mobile network, and
the second wireless access network includes a wireless local coverage network.

9. A wireless access device, the wireless access device comprising:
a processor configured to,
maintain cipher keys of multiple User Equipments (UEs) for accessing a first wireless access network,
receive an access request for accessing a second wireless access network from a UE,
extract a network identification and a UE identification of the UE from the access request, the network identification being a network identification of the first wireless access network accessed by the UE,
send an authentication message to the UE,
receive an encrypted authentication message from the UE, the encrypted authentication message having been encrypted by the UE using a cipher key associated with the UE, the cipher key having been previously used by the UE to access the first wireless access network,
determine, based on the extracted network identification and the UE identification, if the UE has accessed the first wireless access network via the wireless access device, and
authenticate the UE based on the received encrypted authentication message, if the UE has accessed the first wireless access network, the wireless access device integrating the access functions of the first wireless access network and the second wireless access network to facilitate access for the UE to both the first wireless access network and the second wireless access network.

10. The wireless access device of claim 9, wherein
the first wireless access network includes a wireless mobile network, and
the second wireless access network includes a wireless local coverage network.

11. A User Equipment (UE) accessing a wireless access device via a first wireless access network and a second wireless access network, the UE comprising:
a processor configured to,
maintain a cipher key of the UE for accessing the first wireless access network,
send an access request for accessing the second wireless access network to the wireless access device, the access request including a network identification and a UE identification of the UE in the first wireless access network, the network identification being a network identification of the first wireless access network accessed by the UE,
receive an authentication message from the wireless access device, and
send an encrypted authentication message to the wireless access device, the encrypted authentication message having been encrypted by the UE using the cipher key associated with the UE, the cipher key having been previously used by the UE to access the first wireless access network, the wireless access device authenticating the UE based on the sent encrypted authentication message, if the UE has accessed the first wireless access network as determined based on the network identification and the UE identification, the wireless access device integrating the access functions of the first wireless access network and the second wireless access network to facilitate access for the UE to both the first wireless access network and the second wireless access network.

12. The UE of claim 11, wherein
the first wireless access network includes a wireless mobile network, and
the second wireless access network includes a wireless local coverage network.

13. The method of claim 1, wherein the cipher key is a Long term Evolution (LTE) key.

14. The method of claim 6, wherein the cipher key is a Long term Evolution (LTE) key.

15. The wireless access device of claim 9, wherein the cipher key is a Long term Evolution (LTE) key.

16. The UE of claim 11, wherein the cipher key is a Long term Evolution (LTE) key.

* * * * *